United States Patent [19]

Katz

[11] Patent Number: 4,810,006
[45] Date of Patent: Mar. 7, 1989

[54] STABILIZED SHEET MATERIALS FOR USE WITH COMPUTER-DIRECTED PRINTERS AND METHOD OF STABILIZING SAME FOR COMPUTER PRINTERS

[76] Inventor: Marcella M. Katz, 10573 Le Conte Ave., Los Angeles, Calif. 90024

[21] Appl. No.: 53,808

[22] Filed: May 26, 1987

[51] Int. Cl.⁴ ............................................. B42D 19/00
[52] U.S. Cl. .......................................... 281/5; 283/62
[58] Field of Search ........................... 281/2, 5; 283/62

[56] References Cited

U.S. PATENT DOCUMENTS

| | | | |
|---|---|---|---|
| 2,220,499 | 11/1940 | Thomas, Jr. | 281/2 |
| 2,747,894 | 5/1956 | Porter | 281/2 X |
| 3,669,814 | 6/1972 | Faltin | 281/5 X |
| 4,487,645 | 12/1984 | Weston | 281/5 X |
| 4,542,286 | 9/1985 | Golarz | 281/5 X |
| 4,636,099 | 1/1987 | Goldstone | 281/2 X |
| 4,640,529 | 2/1987 | Katz | 281/5 |
| 4,705,297 | 11/1987 | Wakeman | 281/5 X |
| 4,708,503 | 11/1987 | Poor | 281/2 X |

Primary Examiner—Paul A. Bell
Attorney, Agent, or Firm—Philip D. Junkins

[57] ABSTRACT

Flexible sheet material having a print surface on the side for receiving imprinted designs, patterns, graphics, photographs, and textual and instructional information has bonded thereto a flexible non-distortable secondary sheet of non-woven synthetic fiber textile material to provide dimensional stability to the printable sheet material. The secondary sheet of stabilizing material acts as a carrier for the printable material for moving such material through a computer-directed printer. The secondary sheet of stabiliziing material is provided with alignment and feed structure along its edges for interacting with printer drive mechanisms to accomplish the movement of same, with its carried printable sheet material, to and through such a printer. The fabric non-distortable secondary sheet material may comprise and endless belt bearing a pressure sensitive adhesive whereby the printable sheet material is only temporarily bonded to the secondary material for carrying same to, through and beyond the printer.

8 Claims, 2 Drawing Sheets

STABILIZED SHEET MATERIALS FOR USE WITH COMPUTER-DIRECTED PRINTERS AND METHOD OF STABILIZING SAME FOR COMPUTER PRINTERS

BACKGROUND OF THE INVENTION

The present invention relates to printable sheet materials. More particularly, the invention relates to sheet materials including paper, plastic film, woven fabrics, synthetic non-woven fabrics, other thin flexible materials, and laminates of such materials, upon which it is desired to imprint designs, patterns, graphics, photographs, and textual and instructional matter through the use of computer-directed printers.

The need is constantly increasing for imprinting designs, patterns, graphics, photographs, and textual and instructional matter on flexible materials of the foregoing types. Through the use of computers and computer data and information input devices and systems, data, designs, graphics and photographic and textual matter can be readily received and manipulated and thereafter electronically displayed and/or printed out at computer direction. Many flexible sheet materials, even some of the most desirable graphic and photographic papers, are not entirely suitable for feeding to and through the well-known computer printers. This is because many of such materials are not dimensionally stable in their cross direction or machine direction with the application of printer inks or colorants, or they display front and/or back surface characteristics that are not compatible with the computer printer drive mechanisms.

It is an object of the present invention to provide improved sheet materials having a print surface adaptable for receiving computer-generated printed designs, patterns, photographs, and textual and instructional information thereon.

It is a further object of the invention to provide leather, simulated leather, paper, fabrics, flexible woods and wood veneers, flexible plastics, foils, metalized fabrics and plastics and like sheet materials having a print surface on one or both faces thereof adaptable for receiving printed designs, patterns, graphics, photographs and textual and instructional information as directed by a computer.

It is another object of the invention to provide unique method for handling sheet materials which require printing thereon of detailed designs, patterns, graphics, photographs, and textual and instructional information.

It is yet another object of the invention to provide a unique method for printing designs, patterns, graphics or photographs on a wide variety of flexible sheet materials having a print surface on a face thereof with such designs, patterns, graphics or photographs being applied as directed by a computer.

Other objects and advantages of the invention will be apparent from the following detailed description of the invention, taken with the accompanying drawings.

SUMMARY OF THE INVENTION

The present invention relates to improved sheet materials adaptable for receiving computer-directed printed designs, patterns, graphics, photographs, and textual and instructional information and the methodology for producing such materials with such designs, patterns, graphics, photographs and textual and instructional information printed thereon. In a first principal species of the invention the sheet material has a printable surface on one or both sides thereof and is temporarily affixed on its opposite surface to an endless belt of a non-distortable, stable, non-woven synthetic textile carrier material having alignment and feed means located along the parallel edges thereof for moving the carrier material (with its affixed printable sheet material) through a computer-directed printer. In a second principal species of the invention the printable sheet material is permanently affixed to a non-distortable, stable, non-woven synthetic textile carrier material having alignment and feed means along its edges for moving the carrier material (with the permanently affixed printable sheet material) through a computer-directed printer.

The alignment and feed means located along the edges of the carrier material may most commonly comprise a line of uniformly spaced pin holes which penetrate the material and correspond in size and edge spacing to the standardized pin-feed drive (tractor) mechanisms of the many well-known computer-directed printers. Some printers will frictionally engage the carrier material without tractor drives or side bands may be applied to the carrier material to assure uniform feeding thereof (with affixed printable sheet material) through the printer.

The methodology of the present invention for producing sheet materials bearing printed matter, comprises the utilization of digitized images of designs, patterns, graphics, photographs, still objects, live objects, etc. which are computer-directed to a printer and the utilization of key-board generated textual and instructional information computer-directed to a printer. The printer is fed with the flexible printable sheet material borne by its stabilizing non-woven textile carrier material (all synthetic fibers or bi-component fibers). In accordance with the methodology, the visual information is converted into digital information through a digitizer by breaking down the image (the subject matter) into an organized mesh of fine dots which each have an assigned specific numerical value representing the gray level of each dot. The digitizer may be of the video type utilizing the standard video signal information from a video camera, a video cassette recorder or a video disk player; the optical type digitizer utilizing a light emitter and detector; or any other type of image capturing and transmitting system.

Digitized image information is fed to any of the many available types and models of personal computers for conversion to visual image information for CRT display (black and white or color) and for utilization, as computer-directed, by a dot-matrix printer (black and white or color), an ink-jet printer, a thermal printer or by a laser printer to print out the visual image information on the flexible, non-distortable printable sheet material of the invention.

Through a number of available computer software programs the digitized image information may be manipulated and edited by the computer through software menus and keyboard directions. The image may be block pixelized to render it as a mosaic pattern. In addition, through appropriate software programs, artistic and color changes can be made with respect to the displayed image and unique effects can be created. After manipulating the displayed image as described above, the image information is computer-directed to the printer for imprinting on the printable sheet material fed therethrough on its carrier material.

In further species of the invention the improved materials adaptable for receiving computer-directed printed designs, patterns, photographs, graphics, and textual and instructional information comprise sheets of flexible, non-distortable: paper and leather laminates; needlework materials; leather, simulated leather, fabrics, paper-leather and plastic-leather laminates; paper-thin woods and wood veneers and wood laminates with paper or plastic; laminates including non-woven, spun-bonded random fiber plastic sheets; plastic and paper-plastic laminates; foils and foil laminates; and like materials, all carried through the printer via the stabilizing non-woven carrier material. The print surface of any of the foregoing materials can be pretreated with thermal, dielectric and other electrosensitive coatings, photographic base coatings, water-fast coatings or other chemical coatings for improving image receptivity, color, detail or density.

BRIEF DESCRIPTION OF THE DRAWING FIGURES

Figure 3:
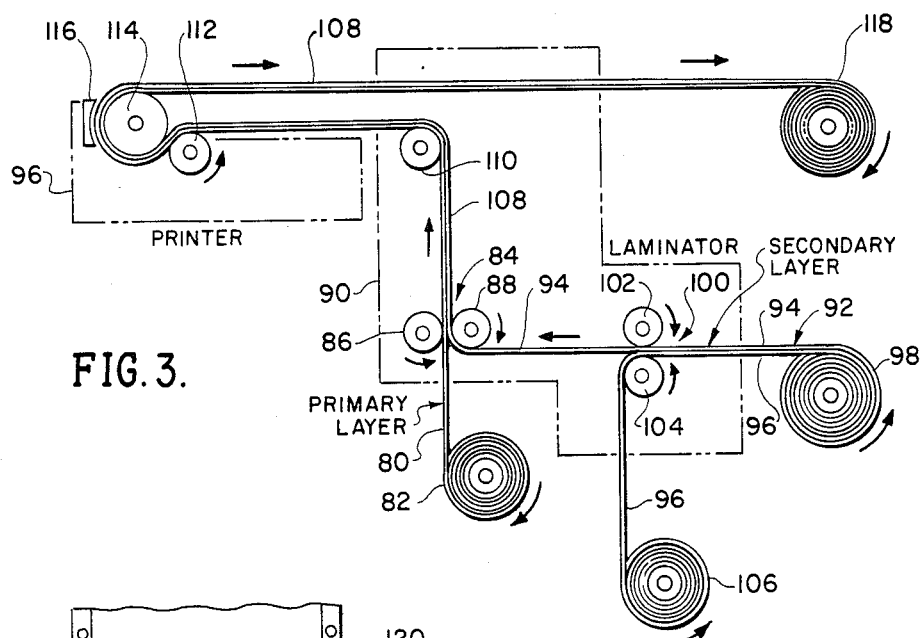
Figure 4:
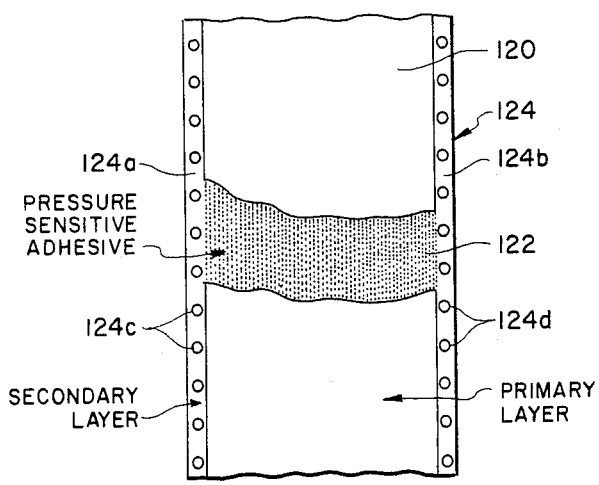

FIG. 3 is a somewhat diagrammatic showing of an alternative method of stabilizing printable sheet materials, which are not in and of themselves entirely suitable for feeding to and through a computer-directed printer, by permanently affixing such materials to a non-distortable, non-woven synthetic textile carrier material adapted for feeding same to and through a printer; and FIG. 4 is a plan view of a portion of an elongated flexible sheet of printable material affixed to and stabilized by a non-distortable, non-woven synthetic textile carrier material adapted for feeding the composite laminated structure of printable material and carrier material through a computer-directed printer.

PREFERRED EMBODIMENTS OF THE INVENTION

Figure 1:
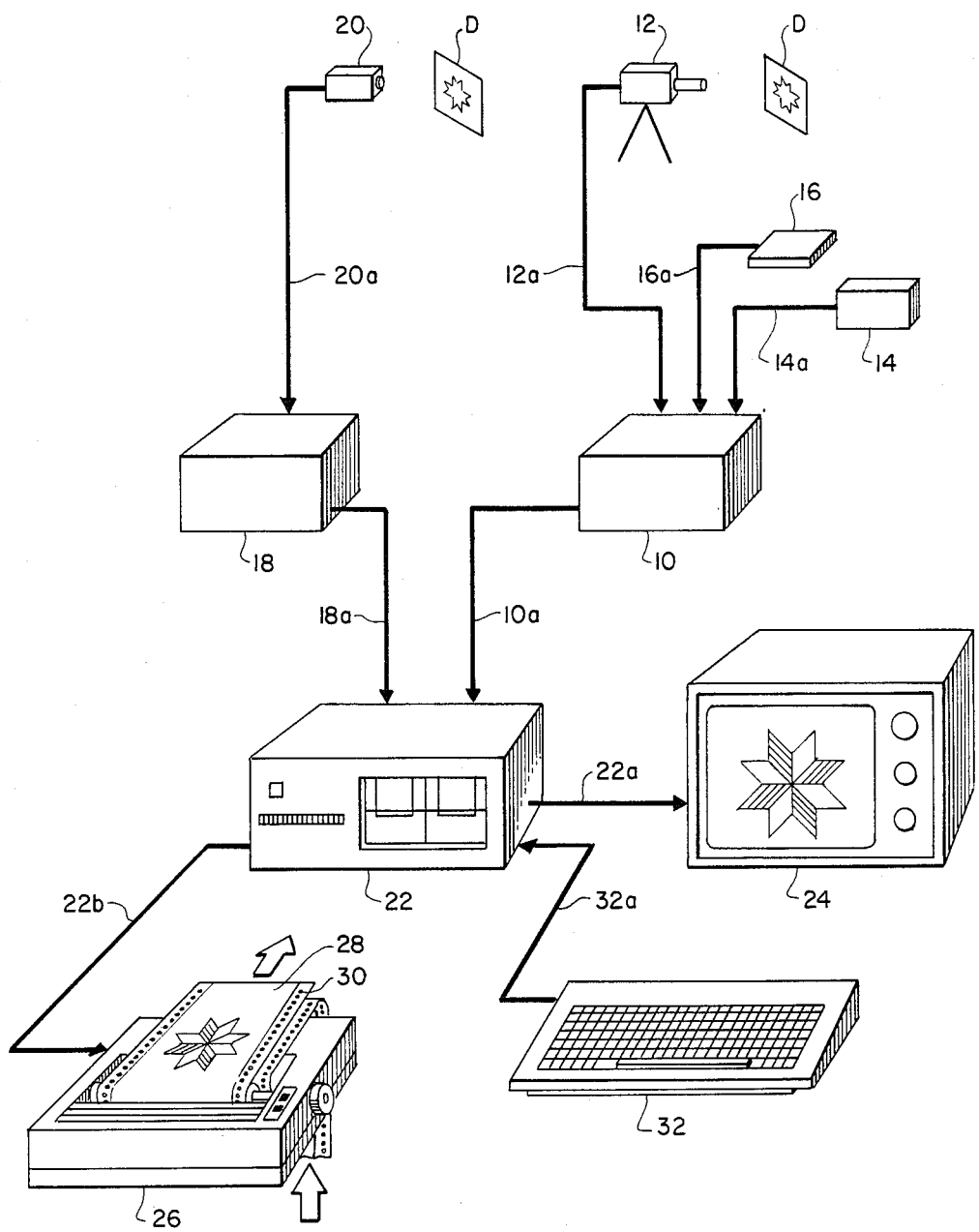
FIG. 1 is a somewhat diagrammatic showing of alternative methods of applying designs, patterns, graphics, photographic prints, images of still or live subjects, and textual and instructional information to the print surface of a sheet of printable material carried through a computer-directed printer in accordance with the invention.

Referring now to FIG. 1 there is shown in somewhat diagrammatic fashion the methodology of applying designs, patterns, photographs, and textual and instructional information to a print surface of one of the flexible sheet materials of this invention. For purposes of describing the methodology, the material illustrative thereof is a flexible paper material treated on its front surface with a photographic coating for improving image receptivity. The particular paper material is not dimensionally stable to the extent desirable for computer printing with high resolution and the paper becomes limp or distorted with the application of high resolution ink or colorants, causing printer jams. Also, the edge portions and back surfaces of the paper may have minute and undiscerbible faults making the paper unsuitable for transport through the printer by conventional drive means without dislodgements.

As previously mentioned, the methodology of the invention for producing materials bearing designs, patterns, photographs and craft instructional information comprises the utilization of digitized images of designs, patterns, photographs, still objects, live objects, etc. which are computer-directed to a printer. The printer is fed with the flexible paper material (with its print receiving surface) affixed to and stabilized by a non-distortable, non-woven synthetic textile carrier material adapted for feeding the laminated needlework material and its carrier material through the printer. In accordance with the methodology the visual information (the design subject matter) is converted into digital information through a digitizer. As shown in FIG. 1 the digitizer may be of either the video type 10 utilizing the standard video signal information from a video camera 12, a video cassette recorder 14 or a video disk player 16 (fed to a digitizer 10 by their respective transmission cables 12a, 14a and 16a) or the optical type 18 utilizing a light emitter and detector unit 20 with the optical signal information fed to a digitizer 18 via transmission cable 20a. All digitizers convert visual information into a mesh of fine dots and assigning a specific numerical value to the gray level found in each dot. Video digitizers use standard video signals created by scanning flat designs, photographs, and three-dimensional objects (still and alive). As shown in FIG. 1 video camera 12 is scanning a flat design D. Optical digitizers, through their emitter-detector system of present day design, scan only photographs, illustrations or other flat artwork D. The emitter projects a tiny beam of light onto the flat image and the light sensitive detector senses the degree of lightness or darkness in each dot of the image as the beam goes over it. Thus, optical digitizers base their generated digital information on the light beam's reflection value. A video digitizer turns the video signals it receives into a stream of binary numbers, reducing the light intensities represented by the video signal to a high-contrast image which a computer can represent digitally.

The digitized information derived through a video digitizer 10 or by an optical digitizer 18 is fed through transmission cable 10a or 18a, respectively, to any one of the many available types and models of personal computers represented in FIG. 1 as micro-computer system unit 22. The micro-computer 22 converts the digital image information into visual information and transmits same via cable 22a to a CRT display unit 24 (black and white or color picture) for viewing. The digital image information is also utilized by micro-computer 22 to direct a printer 26 of either the dot-matrix, ink-jet or laser type to print out (black and white or color) the visual image information on the flexible, photographic paper material 28 affixed to carrier material 30. The readily available and less expensive dot-matrix printers create visual images by producing a series of dots laid out on a grid pattern. These dots are produced by one of three printing methods, i.e. impact, thermal, ink-jet or laser. Computer direction of printer 26 is accomplished via transmission cable 22b and the computer is responsive in its transmitting of display information to CRT display unit 24 and printout information to printer 26 to the commands generated by keyboard 32 (through cable 32a) and graphic and artistic software programs and menus supplied to the computer.

As previously indicated, through a number of available computer software programs the digitized image information relating to a given design, pattern or photograph may be manipulated by, and edited through, keyboard direction. A pattern line grid can be created. The computer-created line grid may be displayed by the CRT unit with the visual image proposed for printing on the photographic paper. The display image may be shifted over the displayed line grid for alignment purposes and the image (if video originated) may be block pixelized to render it as a mosaic pattern matched to the squares within the line grid to cross points of the line grid. An image may be "zoomed" down and then "zoomed" back up to its original size. This process squeezes information out of the image and then displays the image in its lower resolution and thereby more obvious pixel shape, "posturization" can further enlarge the pixel groups and create abstracts of an image. With optical digitization the generated pixels are generally rectangular so that only blocks of pixels can be made to be exactly aligned with the square gridwork. Thus, computer technology and aesthetics are merged and displayed. The computer image pixels are an array of small squares which build into a larger picture or geometric design. Placing these pixels exactly in line with or within the screen grid allows the computer-directed printer to print a mosaic-like picture on the print surface of the photographic paper material in the exact position desired.

Through a number of software programs, artistic and color on-screen designing changes can be made with respect to the CRT displayed image and unique effects can be create thereafter printed out on the printable materials of the invention. Thus image zooming, shifting, rotating, mirroring, stretching, shrinking, transposing, color cycling, color enhancing, mating, multiplying, etc. can be accomplished through software and keyboard direction. After finishing image manipulation as viewed on the CRT screen, the displayed image information is computer-directed to the printer for imprinting on the material.

Figure 2:
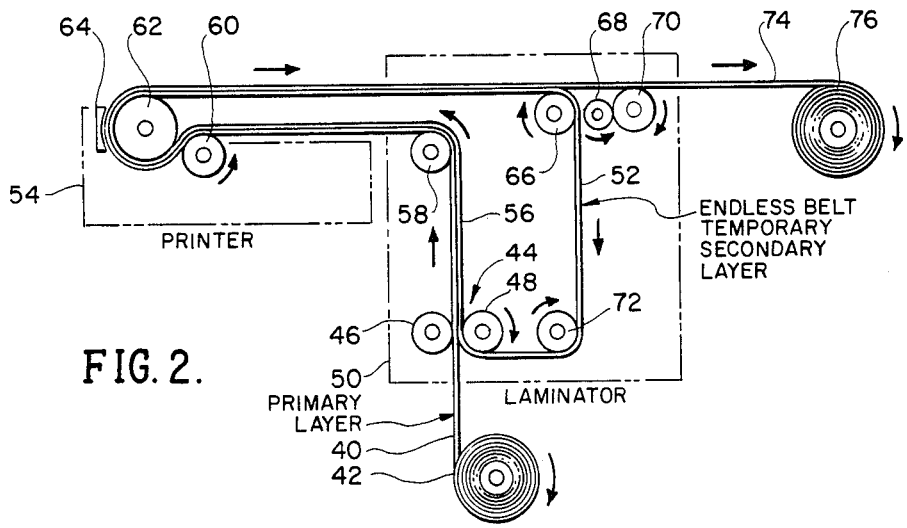
FIG. 2 is a somewhat diagrammatic showing of one method of stabilizing printable sheet materials, which are not in and of themselves suitable for feeding to a computer-directed printer, by temporarily affixing such materials to a non-printer, distortable, non-woven synthetic textile carrier material adapted for feeding same to through a printer.

Referring now to FIG. 2 of the drawings, there is illustrated, in somewhat diagrammatic fashion, one version of the method of stabilizing printable sheet materials (materials not in and of themselves entirely suitable for feeding to and through a computer-directed printer) by temporarily affixing such materials to an endless belt of a non-distortable, stable, non-woven synthetic textile carrier material adapted for feeding to and through a printer. In accordance with the methodology illustrated in FIG. 2, a web of printable sheet material 40, derived from a supply roll 42, is directed as a primary material layer to the pressure nip 44 of a bonding station comprised of opposed pressure rolls 46 and 48 within a lamination zone 50. An endless belt 52, comprised of a web of non-distortable, stable, non-woven synthetic fiber textile material, is utilized as a secondary or carrier layer for transport of the primary web of printable material to and through a computer-directed printer 54. The endless belt of non-woven textile carrier material 52 has applied to its outer surface a pressure sensitive adhesive having appropriate greater cohesion to itself and adhesion to the carrier material than its adhesion to the primary layer 40 of printable material whereby no residue of the adhesive is left on the primary layer after its removal from the carrier material. Alternatively, the carrier material may have adhesive material applied to its inner surface.

The web of carrier material 52, with its temporarily affixed primary layer of printable material 40, travels as a composite laminated web of material 56 from the pressure nip 44 within the lamination zone 50 to and about roller 58 and thence to printer 54. The printer 54 (shown in simplistic diagrammatic form in FIG. 2) includes a guide roll 60, print roll 62 (with associated material drive mechanisms, not shown), and print head 64. The entire actions of the print roll 62 and material drive mechanisms, and print head 64, are directed and controlled by a computer, i.e. the computer 22 of FIG. 1. After the composite layer 56 of printable sheet material and stabilizing carrier material has proceeded through the printer 54, with the printable sheet material imprinted by computer direction, such composite layer re-enters zone 50 and travels an appropriate distance for ink and/or colorant drying to a set of de-lamination rolls 66, 68 and 70. The endless belt of carrier material (with its pressure sensitive adhesive facing) passes over roll 66 and between such roll and idler roll 68 to guide roll 72 for return to the pressure nip 44 by passage around pressure roll 48 for adhesion to additional printable sheet material 40 from supply roll 42. The imprinted sheet material 74 de-laminated from the belt of carrier material 52, moves over roll 70 and may be wound on receiving roll 76 or is otherwise utilized or stored.

In actual experimental practice of the methodology of the species of the invention as illustrated in FIG. 2, the endless belt of carrier material 52 may be made of an elongated sheet of spunbonded polyester fibers. Such material may be comprised of continuous-filament polyester fibers that are randomly arranged, highly dispersed and bonded at the filament junctions. While the chemical and thermal properties of such a material are essentially those of polyester fibers, the material's spunbonded structure endows it with an extraordinary combination of physical properties. Thus, the distinctive characteristics of the material include high tensile strength, outstanding tear strength and toughness, high bulk density and porosity, non-ravel edges, and excellent dimensional stability. A preferred pressure adhesive, for application to the carrier side of the endless belt 52 of spunbonded polyester sheet material, is an acrylic multipolymer adhesive applied to the belt surface as a stable aqueous acrylic emulsion. The resulting pressure sensitive adhesive for temporary interfacing with, and carrier adhesion to, the printable sheet material 40 has excellent tack and peel adhesion with respect to many forms of printable sheet material with good cohesive strength and, when the carrier material (with adhesive coating) is separated from sheet material 40, no adhesive residue is deposited on such sheet material.

Referring now to FIG. 3, there is illustrated, in somewhat diagrammatic fashion, an alternative version of the method of stabilizing printable sheet materials (materials not in and of themselves suitable for feeding to a computer-directed printer) by permanently affixing such material to a non-distortable, stable carrier material adapted for feeding to and through a printer. In accordance with the methodology illustrated in FIG. 2, a web of printable sheet material 80, derived from a supply roll 82, is directed as a primary material layer to the pressure nip 84 of a bonding station comprised of opposed pressure rolls 86 and 88 within a lamination zone 90. A web 92 comprised of: a layer of non-distortable, stable, non-woven synthetic fiber textile material 94 (such as spunbonded polyester sheet material) coated with a pressure sensitive adhesive; and a layer of release paper 96 of any well-known type (silicone release paper, wax paper, etc.) is derived from a supply roll 98. The layer of non-woven textile material 94 (with its adhesive coating) is separated from release paper 96 during passage of the web 92 through a de-lamination station 100 comprised of rolls 102 and 104. The release paper 96 (free of textile material 94) is re-rolled on storage roll 106 for re-use with future supplies of the textile material as such material is coated with adhesive in known fashion. The non-woven textile material 94 (bearing its adhesive coating and free of release paper 96) is also directed to the pressure nip 84 by its transport around pressure roll 88. During their interfaced passage through pressure nip 84, the primary layer of printable sheet material 80 is bonded to the stabilizing carrier layer 94 of non-woven textile material. The resulting bonded layers 80 and 94 travel as a composite laminated web of material 108 from the pressure nip 84 within the lamination zone 90 to and about roller 110 and thence to printer 96.

The printer 96 (shown in simplistic diagrammatic form in FIG. 3) includes a guide roll 112, print roll 114 (with associated material drive mechanisms, not shown), and print head 16. As in the case of the methodology of the invention as described with respect to FIG. 2, the entire actions of the print roll 114 and material drive mechanisms, and print head 116, are directed and controlled by a computer. After the composite layer 108 of printable sheet material and stabilizing carrier material has proceeded through the printer 96, with the printable sheet material imprinted by computer direction, such composite layer 108 moves to a receiving roll 118 or is otherwise cut, fan folded, collated or stored. As in the case of the methodology of the species of the invention as illustrated in FIG. 2, the adhesive utilized on the secondary stabilizing and carrier layer 94 may be an acrylic multipolymer adhesive applied to the carrier material as a stable aqueous acrylic emulsion.

In FIG. 4 there is illustrated one form of the composite layer 56 (FIG. 2) or 108 (FIG. 3) of printable primary sheet material and secondary stabilizing carrier material as fed to printer 54 or 96, respectively. As shown, the primary layer 120 of printable sheet material is bonded (temporarily in the case of the methodology of FIG. 2 or permanently in the case of the methodology of FIG. 3) by an adhesive coating 122 to the secondary layer 124 of stabilizing carrier material. Along the parallel edge portions 124a and 124b of the carrier material 124 are located a line of uniformly spaced pin holes 124c and 124d, respectively, which corresponds in size and edge spacing to standardized pin-feed (tractor) drive mechanisms of the well-known computer-directed printers. Such printers commonly handle feed material widths of 4 to 15.5 inches and special printers are available which accept feed material widths of 4 feet or more. The need for a stabilizing carrier layer or layers for printable sheet materials (in accordance with the invention) increases as the width of such materials increases because it is desirable to apply a total taunt (all directions) to the printable sheet materials. As previously indicated, some printers will frictionally engage the edges of the carrier material without tractor drives or side bands may be applied to the carrier material to assure uniform feeding thereof (with affixed printable sheet material) through the printer.

It will be understood by those skilled in the art that many different types of printable sheet material may be subjected to computer-directed printing in accordance with the invention. Also, through the use of temporary attachment of a stabilizing carrier material as described with respect to methodology related to FIG. 2 of the drawings, sheet materials of various kinds having a printable surface on each side thereof may be imprinted, first on one side and thereafter (under computer alignment) on the other. Further, although acrylic based emulsion type adhesives have been indicated as preferred adhesives for coating the carrier layer of material (either in the form of an endless belt or permanently affixed layer), other pressure sensitive adhesives may be used including aqueous based or solvent based adhesives formed of polymerized or copolymerized acrylic or vinyl polymers or a hot melt adhesive of acrylic based or rubber based type. Since many printers generate heat during their operation, it is important that the adhesive system utilized be heat stable and not have a low ignition point. In addition, other types of non-woven textile materials may be utilized as the stabilizing carrier material, provided such material has appropriate and compatible chemical and thermal properties and displays physical characteristics of high tensile strength, outstanding tear strength and toughness, high bulk density and porosity, non-ravel edges, and excellent dimensional stability. Thus, the non-woven textile materials may be formed from a wide variety of spunbounded synthetic fibers, mixed synthetic fibers or mixed synthetic and natural fibers.

The present invention is applied to a wide variety of printers including laser printers, electrostatic dot-matrix printers, thermal transfer printers and ink-jet printers. The invention solves a major problem that occurs with some of these printers when high resolution inks and special colorants are used to imprint certain coated and non-coated sheet materials i.e., printer jams caused by the sheet material becoming limp and unstable with the application of such inks or dislodgements during multiple color passes. The carrier materials of the present invention are intended to apply a total, multidirectional taunt to the printable sheet materials carried thereby.

In the specification and drawing figures there has been set forth preferred embodiments of the invention and although specific terms have been employed, they are used in a generic and descriptive sense only and not for purposes of limitation, the scope of the invention being defined in the following claims.

What is claimed is:

1. A flexible primary web of sheet material having a print surface on at least one side thereof for receiving imprinted designs, patterns graphics, photographs, and textual and instructional information from a computer-directed printer and having bonded thereto by a pressure sensitive adhesive a non-distortable secondary web of spunbonded synthetic material to provide dimensional stability to said primary web of printable sheet material, said secondary web of stabilizing sheet material bearing said adhesive over its surface area interfacing with said primary web of sheet material and being provided with alignment and feed means along its edges for interacting with printer drive means whereby said secondary web of material acts as a carrier for said printable sheet material for moving said printable material to, through and beyond said printer.

2. A flexible primary web of sheet material having a print surface on at least one side thereof as claimed in claim 1 wherein the non-distortable secondary web of synthetic fiber material is removable from the primary web of printable sheet material after the latter has been carried through a computer-directed printer by said secondary web of material.

3. A flexible primary web of sheet material having a print surface on at least one side thereof as claimed in claim 2 wherein the non-distortable secondary web of synthetic fiber material is in the form of an endless belt and is bonded to the primary web of printable sheet material only over the period of time during which said secondary web of material carries the primary web of printable sheet material immediately prior to, through and beyond said printer until the inks and/or colorants imprinted on said primary web of printable sheet material have dried.

4. A flexible primary web of sheet material having a print surface on at least one side thereof as claimed in claim 1 wherein said pressure sensitive adhesive is an acrylic multi-polymer adhesive applied to said secondary web of material as a stable aqueous emulsion.

5. A flexible primary web of sheet material having a print surface on at least one side thereof as claimed in claim 1 wherein the secondary web of spunbonded synthetic material is formed of spunbonded polyester fibers.

6. A flexible primary web of sheet material having a print surface on at least one side thereof as claimed in claim 1 wherein the alignment and feed means along the edges of said secondary web of material comprises a line of uniformly spaced pin holes through said material for receiving the pin-feed drive means of a computer-directed printer.

7. A flexible primary web of sheet material having a print surface on at least one side thereof as claimed in claim 1 wherein the alignment and feed means along the edges of said secondary web of material comprises means for frictionally engaging the friction feed drive means of a computer-directed printer.

8. A flexible primary web of sheet material having a print surface on at least one side thereof as claimed in claim 1 wherein said primary web of printable sheet material is selected from the group comprising: paper and paper laminates; woven fabrics, needlework materials, leather, suede, simulated leather, paper-leather and plastic-leather laminates; paper-thin woods and wood veneers and wood laminates with paper and plastic; laminates including non-woven, spunbonded random fiber plastic sheets, plastic and paper-plastic laminates; metallic foils and foil-paper, foil-fabric and foil-plastic laminates; and like materials.

* * * * *